May 31, 1955  J. A. ORR, SR  2,709,602
ADJUSTABLE WHEEL MOUNTING FOR MOWERS AND THE LIKE
Filed June 27, 1952
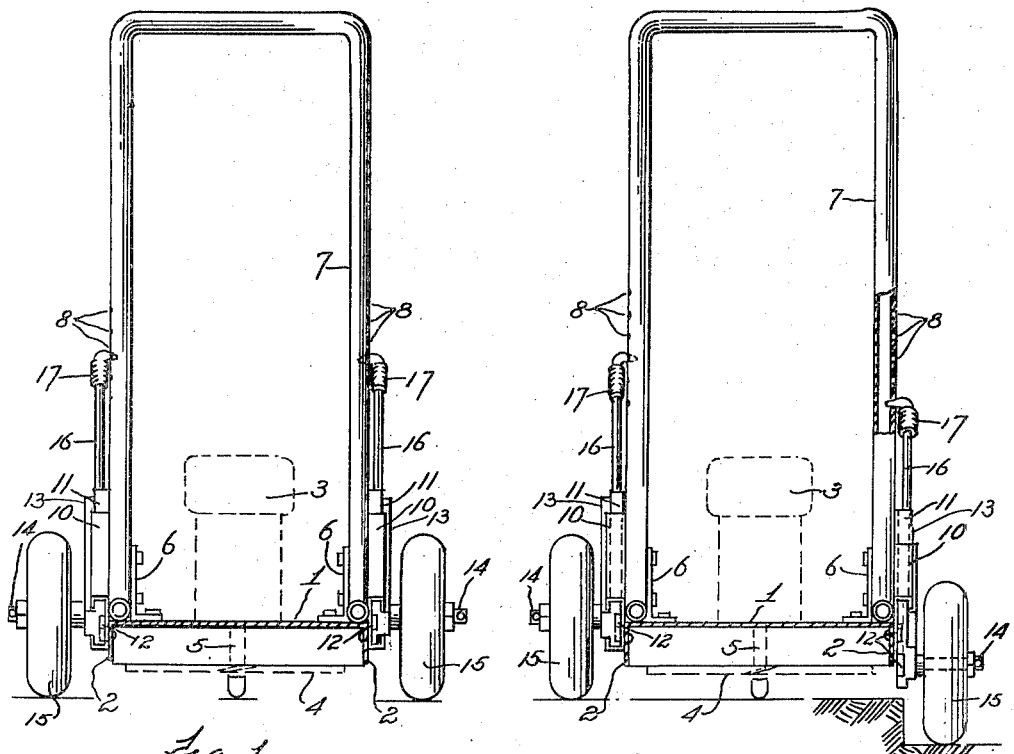
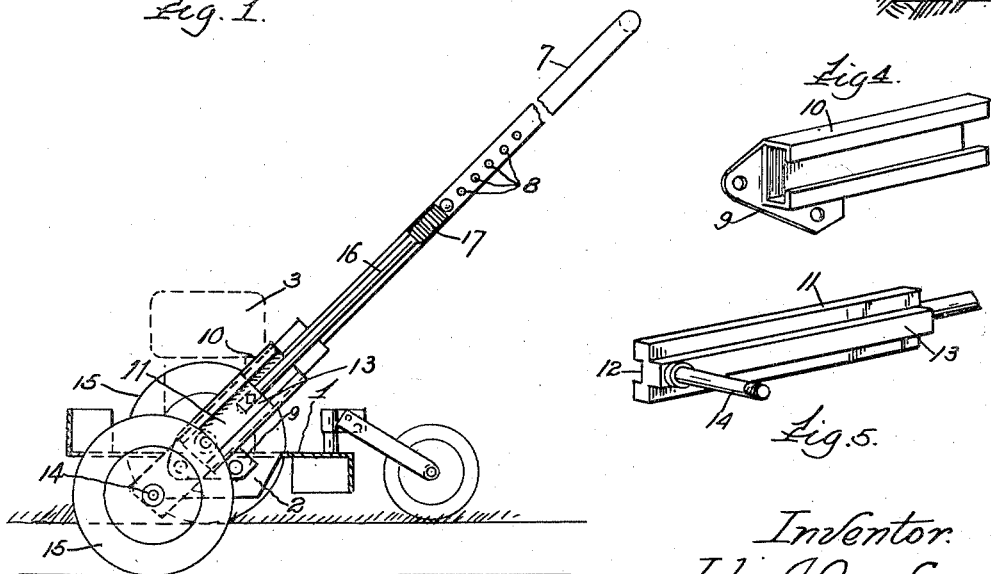
Inventor.
John A. Orr, Sr.
by H. J. Sanders
Attorney United States Patent Office 2,709,602
Patented May 31, 1955

2,709,602

ADJUSTABLE WHEEL MOUNTING FOR MOWERS AND THE LIKE

John A. Orr, Sr., Chicago, Ill.

Application June 27, 1952, Serial No. 295,999

2 Claims. (Cl. 280—6)

This invention relates to rotary lawn mowers, grass cutters and the like of the home-owner type. One object is to provide a mower wherein the main support wheels are independently adjustable selectively so that the blade may remain horizontally disposed even though the wheels are operating at different levels.

A further object is to provide means for independently adjusting the vehicle wheels without the use of tools and without any particular effort on the part of the operator, the wheels remaining in adjusted positions without the possibility of their respective positions being accidentally disturbed.

A further object is to provide a mower and/or grass cutter wherein the support wheels may be so adjusted relatively that the grass may be evenly cut with one wheel running along the curb while the other wheel travels upon the sod.

A still further object is to provide a mower or grass cutter having wheel-adjusting means of the type specified that are simple in construction, positive and efficient in operation, not easily put out of order, of few parts and inexpensive to manufacture.

A further object is to provide a mower or grass cutter wherein the rotary cutting blade may be raised from a point ½" above the ground line up to a point 6" above the ground and stopped selectively at intermediate points.

Other objects and advantages reside in the novel details of construction and operation as more fully hereinafter described, defined in the claims and illustrated in the accompanying drawing forming part hereof and wherein like reference characters denote corresponding parts throughout.

In the drawing:

Fig. 1 is a fragmentary view, partly in front elevation and partly in vertical section, through a mower according to the instant invention, disposed upon level ground.

Fig. 2 is a view similar to Fig. 1 but showing the mower upon uneven ground, as with one wheel upon the sod and one upon the curb.

Fig. 3 is a side view of Fig. 2.

Fig. 4 is an enlarged detail view, in perspective, showing a slide track forming part of the invention, and, Fig. 5 is a similar view of a slide block and connections operative in the slide track of Fig. 4.

The reference numeral 1 denotes the bed or frame of a mower having downturned flanges 2, a motor 3 and a rotary blade 4 mounted fast to the motor shaft 5. Secured fast to the frame 1 by brackets 6 is the U-shaped tubular handle 7 that extends obliquely upwardly and rearwardly by means of which the operator propels the vehicle over the ground, the sides of the handle at a material elevation from the frame 1 formed with a plurality of small perforations 8 spaced desirably ½" apart, the perforations 8 of one side of the handle being directly in line with those of the opposite handle side.

Secured, as by bolting or riveting, to the side flanges 2 of the motor frame 1 are the angular flanges 9 of the oblong tracks 10, C-shaped in cross section, disposed opposite each other upon the relatively remote sides of said frame flanges, said tracks extending upwardly and rearwardly from the frame 1 parallel and contiguous to the sides of handle 7, said tracks being open at their ends and their open sides disposed outwardly.

Slidably received in each track 10 is an oblong block 11 formed complementary thereto and each having a longitudinally extending clearance recess 12 along its inner face and directly opposite thereto with a rib 13 extending from end to end of the block and disposed in the opening in the outer face of said track, said rib having fast thereto, adjacent its lower end, the axle 14 having thereon a conventional rubber-tired wheel 15. Bolted or otherwise secured to the upper or head end of the block 11 is the pitman 16 having fast thereon at its upper end the handle 17 beyond which said pitman is bent inwardly and tapered for releasable engagement selectively with the perforate portions 8 of said handle 7.

The operator in propelling the vehicle over the ground by means of the handle 7 pulls or pushes the mower frame directly as the handle is secured thereto by the brackets 6, the wheels 15 being propelled by the axles 14 carried by the slide blocks that are movable in the tracks 10 by means of the pitmans 16 engaged adjustably in the perforations 8 of said handle. Adjustment of each wheel is made by means of a handle 17 to adjust a pitman along the mower handle 7 as previously described.

What is claimed is:

1. In a manually propelled mower, a horizontal frame having downturned lateral flanges, a substantially U-shaped tubular handle secured to said frame and extending obliquely upwardly and rearwardly therefrom and formed upon each side adjacent the upper end thereof with a plurality of spaced perforations, tracks secured to said frame flanges, complementarily formed slide blocks operative in and instantly removable from said tracks, pitmans connecting said slide blocks adjustably to perforate portions of said handle and for instantly removing said slide blocks from said tracks, said pitmans in easy reach of an operator of the mower, and wheels carried by said slide blocks.

2. In a horizontally rotatable blade mower, a frame, a substantially U-shaped handle secured to said frame and extending obliquely upwardly and rearwardly therefrom and formed upon each side adjacent the upper end with spaced perforations, tracks secured to said frame, slide blocks in said tracks, axles carried by said slide blocks, wheels on said axles, and manually operable means adjustably connecting said slide blocks to perforate portions of said handle and for instant removal of said slide blocks from said tracks when necessary, said means in operative proximity to the operator at the handle of the mower.

References Cited in the file of this patent

UNITED STATES PATENTS

| 745,911 | Savoie | Dec. 1, 1903 |
| 1,300,093 | Adams | Apr. 8, 1919 |
| 2,473,873 | Fosbender | June 21, 1949 |
| 2,552,951 | Freeman | May 15, 1951 |